Jan. 25, 1949.  K. CLARK  2,459,919
BOMB SIGHT
Filed March 31, 1944  7 Sheets-Sheet 1

INVENTOR.
BY Kendall Clark
Spencer Hardman and Fehr
Attorneys

Jan. 25, 1949.     K. CLARK     2,459,919
BOMB SIGHT

Filed March 31, 1944     7 Sheets-Sheet 2

INVENTOR.
Kendall Clark
BY
Spencer Hardman and Fehr
Attorneys

Jan. 25, 1949.  K. CLARK  2,459,919
BOMB SIGHT
Filed March 31, 1944  7 Sheets-Sheet 4

Fig. 6

INVENTOR.
Kendall Clark
BY Spencer Hardman and Fehr
attorneys

Jan. 25, 1949.　　　　　　K. CLARK　　　　　2,459,919
BOMB SIGHT

Filed March 31, 1944　　　　　　　　　　　　　7 Sheets-Sheet 6

INVENTOR.
Kendall Clark
BY Spencer Hardman & John
Attorneys

Jan. 25, 1949. K. CLARK 2,459,919
BOMB SIGHT
Filed March 31, 1944 7 Sheets-Sheet 7

Fig. 12

INVENTOR.
Kendall Clark
BY
Spencer Hardman & Fehr
Attorneys

Patented Jan. 25, 1949

2,459,919

UNITED STATES PATENT OFFICE 2,459,919

BOMB SIGHT

Kendall Clark, Oakwood, Ohio, assignor to General Motors Corporation, Dayton, Ohio, a corporation of Delaware Application March 31, 1944, Serial No. 529,013

13 Claims. (Cl. 33—46.5)

This invention relates to aeronautical apparatus and more particularly to bombsights for low and medium altitude bombing.

The famous precision bombsights which are now used for high altitude bombing are not satisfactory for low altitude bombing. One of the reasons for this is that these high altitude bombsights use a telescope sight and when used at low altitudes the target on the ground flashes by beneath the plane so rapidly that it is difficult to follow it with such a sight. Such precision bombsights are also very complicated, expensive and difficult to manufacture. In many situations it is of advantage to use low or medium altitude bombing rather than high altitude bombing.

It is therefore an object of my invention to provide a new and improved bombsight for low and medium altitude bombing which is simple, inexpensive and readily manufactured.

It is another object of my invention to provide a low and medium altitude bombsight which employs a collimating sight.

It is another object of my invention to provide a simple, easily manufactured bombsight which can be so accurately set and adjusted for the effect of wind, the air friction characteristics of the bomb and the plane speed and direction, and which provides an accurate indication of the releasing point of the bomb.

It is another object of my invention to provide a bombsight which incorporates a very simple calculating device making it possible to accurately set the bombsight without reference to bombing tables at altitudes less than 3,000 ft.

It is still another object of my invention to provide an improved bombsight with improved and more simple mechanism for maintaining a true vertical reference as well as a more simple mechanism for setting into the bombsight drift, cross trail and dropping angle.

Further objects and advantages of the present invention will be apparent from the following description, reference being had to the accompanying drawings, wherein a preferred form of the present invention is clearly shown.

The problem of bombing

Figure 1:
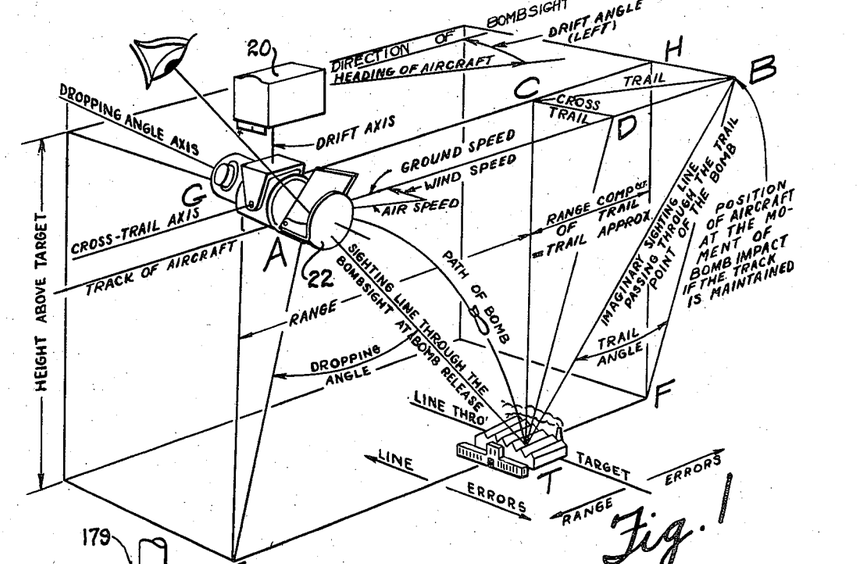
Fig. 1 is a diagrammatic illustration of the use of my improved bombsight in a level bombing attack.

Referring now more particularly to Fig. 1, there is shown diagrammatically my improved bombsight including the head 20 and the collimator 22. The support 151 for the head and collimator is normally held in a fixed position relative to the aircraft in which it is installed and in Fig. 1 corresponds to the heading of the aircraft which is indicated by an arrow so marked. Beneath this arrow and parallel to it is an air speed arrow indicating the speed and heading of the aircraft. An arrow is also provided for the wind speed and the vector sum of the air speed and wind speed arrows designates the true ground speed and direction designated by the arrow which completes the vector triangle. This ground speed arrow indicates the track of the aircraft carrying the bombsight, which is indicated by the line AB.

The bombsight is shown at the releasing point of the bomb with the sighting line through the bombsight at the time of the bomb release extending directly to the target T on the ground. The point B represents the position of the aircraft at the moment the bomb hits the target if the aircraft continues in the straight line or track taken at the time of the release of the bomb. Since there is a lateral wind, the bomb will not fall directly under the track of the aircraft AB but it will drift to the left so that it will fall along the line EF on the ground, which is directly beneath the line GH at the elevation of the aircraft. The target T is directly beneath the point C on the line GH and the point D is a point on the line AB of a perpendicular from the point C as well as the target T.

The angle EAT represents the dropping angle, usually expressed in degrees, while the angle FBT indicates the trail angle, usually expressed in mills. The line BC represents the trail and the line CD represents the cross-trail which is equal to the trail times the sine of the drift angle, while the line ET which equals the lines AD and GC represents the range. The line TF which is equal to the lines DB and CH represents the range component of the trail which is approximately equal to the trail under normal conditions, particularly of low altitude bombing. This is true because in modern aircraft, the speed of the aircraft is so much greater than the wind speed that the effect of wind speed is small and this keeps the drift angle small and makes the trail substantially equal to its range component. The diagram Fig. 1 has had the effect of wind speed and drift exaggerated to make these effects more evident.

The sighting device

Instead of employing a telescopic sighting device, I employ a reflecting type collimator. As shown best in Fig. 8, this collimator includes a barrel 24 having a reticule glass 26 fastened to it by the ring 28 and suitable gaskets and screws. The reticule glass 26 is preferably frosted on the side nearest the lamp while the opposite side is provided with a silvered surface over which black lacquer is applied. Inscribed on this black lacquered and silvered surface are two vertical lines .040" apart and a horizontal line provided with a .020" gap between the vertical lines forming the reticule. The other end of the barrel 24 is provided with a flange 30 to which is fastened a bracket 32 provided with a clear sealing glass 34 for sealing the optical barrel 24. This sealing glass is held in place by a ring 36 and the fastening screws 38 which fasten the bracket 32 to the flange 30 of the optical barrel.

The bracket 32 carries a mirror supporting bracket 40 provided with an axial groove 42 upon its lower surface which receives a pair of guide pins 44 which project up from the supporting surface of the bracket 32. The mirror supporting bracket 40 may be moved in or out guided by the groove 42 and the pins 44. It is locked in its adjusted position by the fastening screws 46 (see Fig. 4). The mirror supporting bracket 40 is provided with a ring receiving a mirror 48 of crown glass with a polished spherical surface of 10¾" radius on the one side. The spherical surface is chrome plated or chrome aluminumized to provide the spherical reflecting surface which will not tarnish readily. The mirror 48 is held in place in its ring by the retaining plate 50 which is fastened by screws to the end of the mirror bracket 40.

Adjacent the mirror the mirror bracket is provided with a rib 52 extending at an angle of 45 degrees to the axis of the mirror. To this rib 52 is fastened, by screws, a reflecting glass plate 54 of clear optical glass which extends completely across the face of the mirror and several inches beyond the mirror. The portion beyond the mirror is provided with a center line 56. This line is preferably scratched into the glass and filled with luminous paint.

The barrel 24 is rotatably mounted upon three pairs of ball bearings 58 which serve as rollers which ride upon the ends of the central outer finished surface of the barrel 24 which is provided with shoulders at the ends against which the ball bearings 58 ride. The ball bearings are supported upon the stub shaft projecting from the ends of three squared shafts 60 which are fastened by the screws 62 to the collimator support 64. This collimator support 64 includes a removable cap member 66 at its bottom which is fastened by screws to the remaining portion of the collimator support 64.

Figure 11:
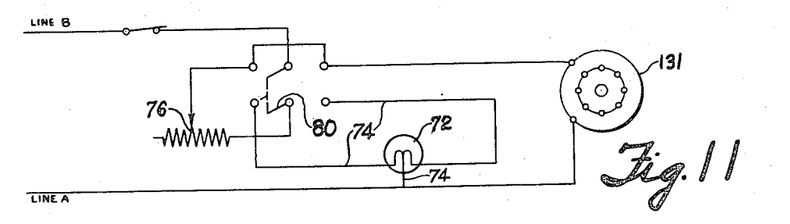
Fig. 11 is an electric wiring diagram for the sight.

To one end of the collimator support 64 there is fastened by four screws a lamp housing 68 provided with a removable lamp supporting bracket 70 which supports within the housing a 32 volt double filament lamp 72 (see Fig. 11). The lamp supporting bracket 70 is connected to the housing 68 by a bayonet slot arrangement permitting quick removal for inspection and replacement of the lamp 72. The lamp housing 68 also preferably contains a reflector for directing the light from the lamp upon the reticule glass 26. Although the lamp housing 68 is shown fastened directly to the collimator support 64 this is done for the reason of minimizing the movement of the electric wiring 74 which connects to the lamp 72. It is also possible to connect the lamp housing 68 directly to the optical barrel 24. In such a case the electrical cord must move with the rotation of the barrel 24. The reticule 26 is illuminated by the double filament lamp 72 which may have its intensity varied by a rheostat 76 which is adjusted by the knob 78. A double-throw switch 80 for energizing either of the filaments is provided on the casing 105 so that in the event one filament burns out the second filament can be readily switched on.

By this arrangement when the vertical and horizontal lines forming the reticule on the reticule glass 26 are illuminated and the mirror 48 is adjusted so that its focal point is at the reticule, an illuminated image of the reticule will appear on the reflecting glass 54. When properly adjusted this illuminated image of the reticule will appear as if it were substantially fixed on an object in the distance and will provide a sighting line perpendicular to the axis of the mirror 48 and the center line 56 on the reflecting glass 54. In order to improve this focusing arrangement I have provided within the optical barrel 24 a correcting glass 82 which is supported on an arm 84 extending from the bracket 32. This is sealed within the optical system and a desiccant tablet 86 is provided within the sealed barrel to absorb all the moisture within this sealed enclosure. This prevents any moisture from condensing upon the clear glass 34 at the end of the barrel opposite the light 72. The correcting glass 84 is a clear optical plate glass ¼" thick. This correcting glass, to obtain the effect desired, must be positioned at an angle of 45 degrees to the axis of the mirror 48 and transverse to the reflecting glass 54.

The pendulum structure

The collimator 20 forms the bottom of a pendulum structure having a universal pivot. The collimtator support 64 is pivotally mounted upon a pair of pivot pins 87 which are fixed in the forked lower end of the pendulum arm 88 to form the cross trail axis. The lower end of the pendulum arm 88 is also provided with a yoke 90. The upper end of the pendulum arm 88 is provided on opposite sides with ball bearings 92 which are mounted upon hollow pivot pins 94 extending inwardly from the rectangular gimbal ring 96. These hollow pivot pins 86 are threaded into the ring 96 and are fastened in place by lock nuts. The rectangular gimbal ring 96 is also provided with a set of ball bearings 97 which are mounted upon a pair of hollow pivot pins 98 which are threaded through a set of ribs 101 which extend across a large aperture 103 in the bottom of the casing 105 of the head 20. These ball bearings 92 and 97 mounted upon the pivot pins 94 and 98, together with the gimbal ring 96, form the universal or Hooke's joint pivot for the pendulum.

The pendulum damper

The pendulum is so balanced that it will hang downwardly giving its arm a tendency to remain in a vertical position so as to form a vertical reference line. Inasmuch as the airplane carrying the bombsight is buffetted around considerably while in the air the pendulum will tend to swing violently and would not remain sufficiently still to do any sighting with it under most conditions. In order to stop the swinging of the pendulum and yet allow it to adjust itself to the vertical reference line at all times I provide a damping dome bracket 107 which is fastened on top of the pendulum. This bracket includes a mounting section fastened in top of the pendulum arm 88 by screws and a couple of bowed arms extending around the trail arm 199 and guide 216 up to a spherical surfaced dome 109. The radius of the spherical surface is struck from the pivot point of the pendulum.

Resting on the spherical surface of this dome 109 is a flanged plunger 111 provided with a rounded friction button 113 of a hard felt or other fibrous friction material in actual contact with the surface of the dome 109. A flat spring 115 presses down on the retaining screw which holds the friction button 113 in resilient contact with the top surface of the dome 109 to snub the movement of the pendulum. This flat spring 115 is fastened to a pivoted bracket 117 connected by the pivot pin 119 to the damping mechanism case 121 which is fastened by the screws 123 to the vertical rear wall of the casing 105. The spring 115 is tensioned by a knob 125 fastened to the splined upper end of the screw 127 which bears upon the pivot member 117 and is threaded into the damping case 121. By turning the knob 125 the tension of the spring 115 upon the plunger 111 holding the friction button 113 on the dome 109 may be increased or decreased to increase or decrease the damping effect of the damping mechanism. When the flight is smooth, only a light spring tension need be used, but when the flight is rough the knob 121 should be adjusted to increase the tension of the spring 115.

Figure 10:
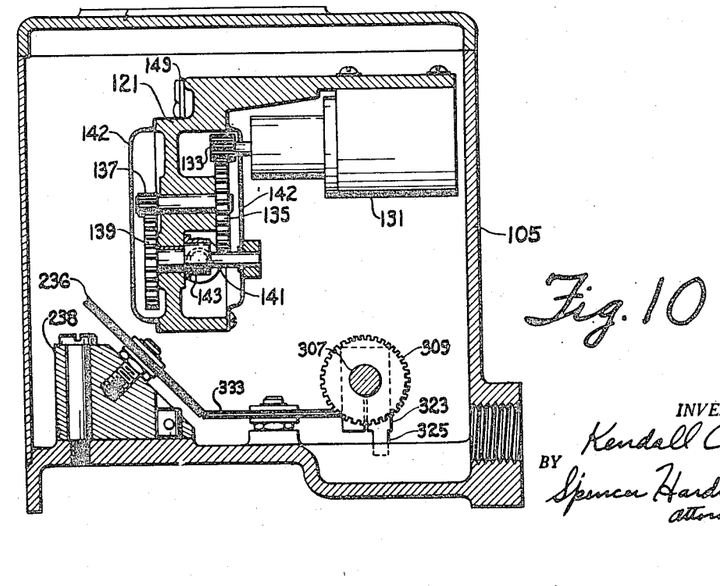
Fig. 10 is a sectional view taken substantially along the line 10—10 of Fig. 4.

The damping case 121 is provided with an arm 129 having an aperture which receives and serves as a vertical guide for the plunger 111. To allow the pendulum to maintain a vertical position regardless of the tilting of the plane, means are provided for intermittently lifting the plunger 111 so that the friction button 113 is lifted off of the dome at a rate of about 400 times a minute. This mechanism, called a stabilizer or damping mechanism, includes a small high speed electric motor 131 (see Fig. 10) fastened to the damping case 121. This motor 131 is provided with a pinion 133 meshing with the idler gear 135 fixed to the shaft of the idler pinion 137 which meshes with the final gear 139 provided upon the eccentric or cam shaft which carries the eccentric or cam 141. The idler gear shaft and the cam shaft are supported in bearings provided in the damping mechanism case 121. Covers 142 enclose the gearing so that it may be packed in a suitable lubricant.

The eccentric or cam 141 is provided with a follower ring 143 engaging a follower pin 145 which extends through a bushing in the damping mechanism case 121 and contacts the connecting pin 147 of a bell crank lever 149. This lever 149 is split into two halves and is provided with a horizontal arm which extends upon opposite sides of the plunger 111 beneath its head. This horizontal arm has a plurality of projections for contacting the underneath side of the head at diametrically opposite points. When the motor operates through the reduction gearing it operates the cam or eccentric 141 to reciprocate the follower pin 145 and the bell crank lever 149 to intermittently raise the plunger 111 to intermittently relieve the pendulum of its damper. This allows the pendulum to intermittently move to its true vertical position between intermittent damping. By this arrangement the pendulum is effectively stabilized, so that a steady sight is obtained even though it is mounted in an airplane.

Drift correction

Figure 7:
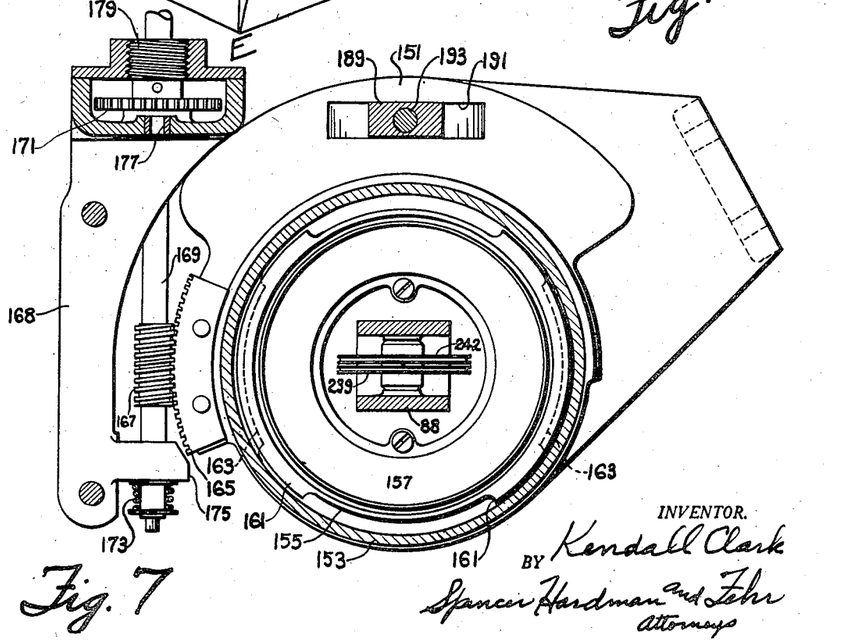
Fig. 7 is a sectional view taken substantially along the line 7—7 of Fig. 6.

In order to make possible to correct for drift, the casing 105 is rotatably mounted upon a support member 151. (See Fig. 7.) The axis of rotation is vertical and extends through the center point of the gimbal ring 96. In this arrangement the casing 105 is provided with a depending circular flange 153 while the support member 151 is provided with an upwardly extending circular flange 155, which is shaped to permit the reception of a substantially spherical dust shield 157 fastened to the flange 159 provided upon the pendulum member 88. This dust shield 157 keeps dust from getting into the casing 105. The flange 155 is provided with two diametrically opposite projections 161 with recessed portions in between so that they may receive the diametrically opposite projections 163 provided upon the flange 153.

Figure 6:
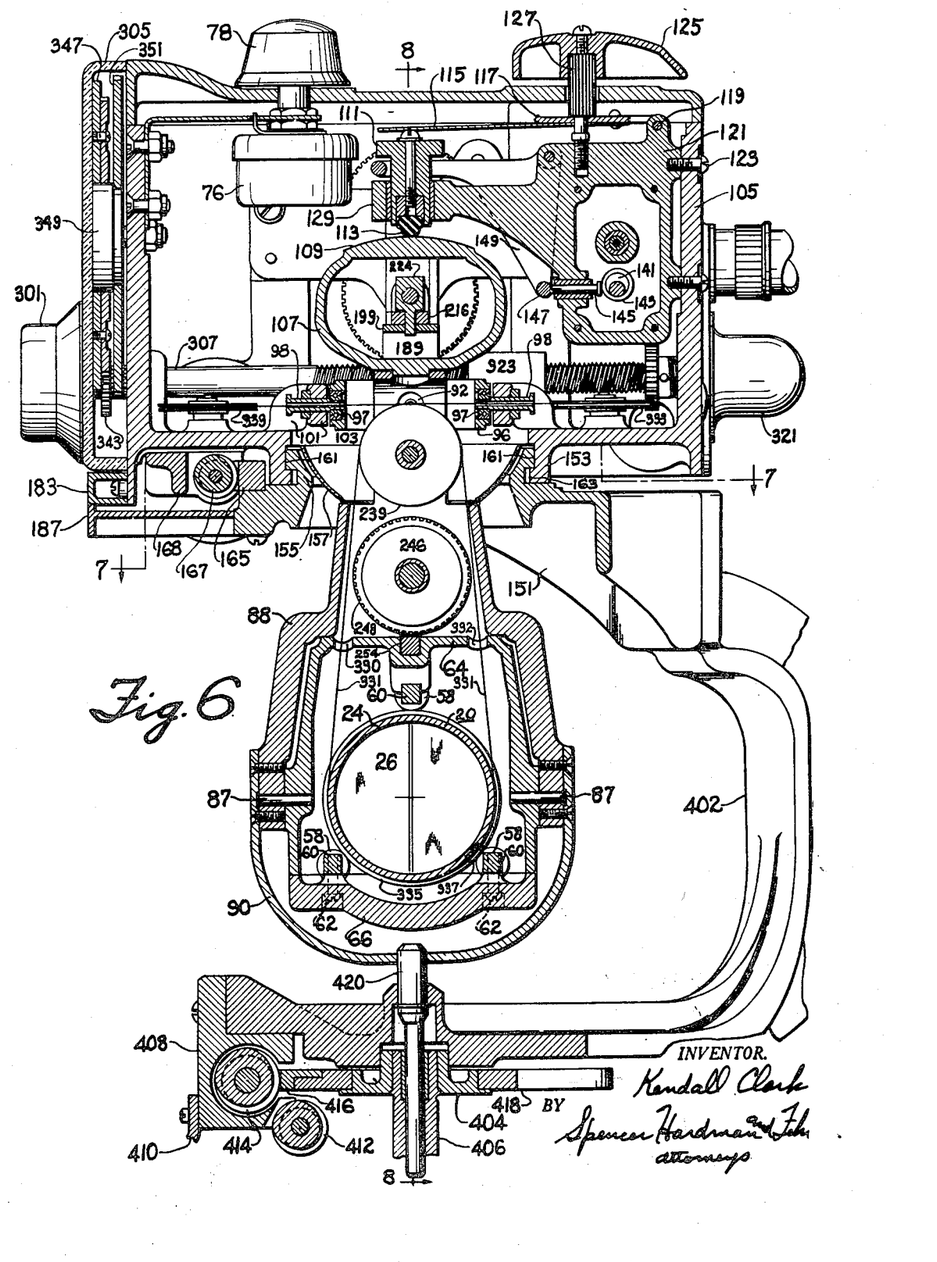
Fig. 6 is a vertical sectional view taken substantially along the line 6—6 of Fig. 4.
Figure 8:
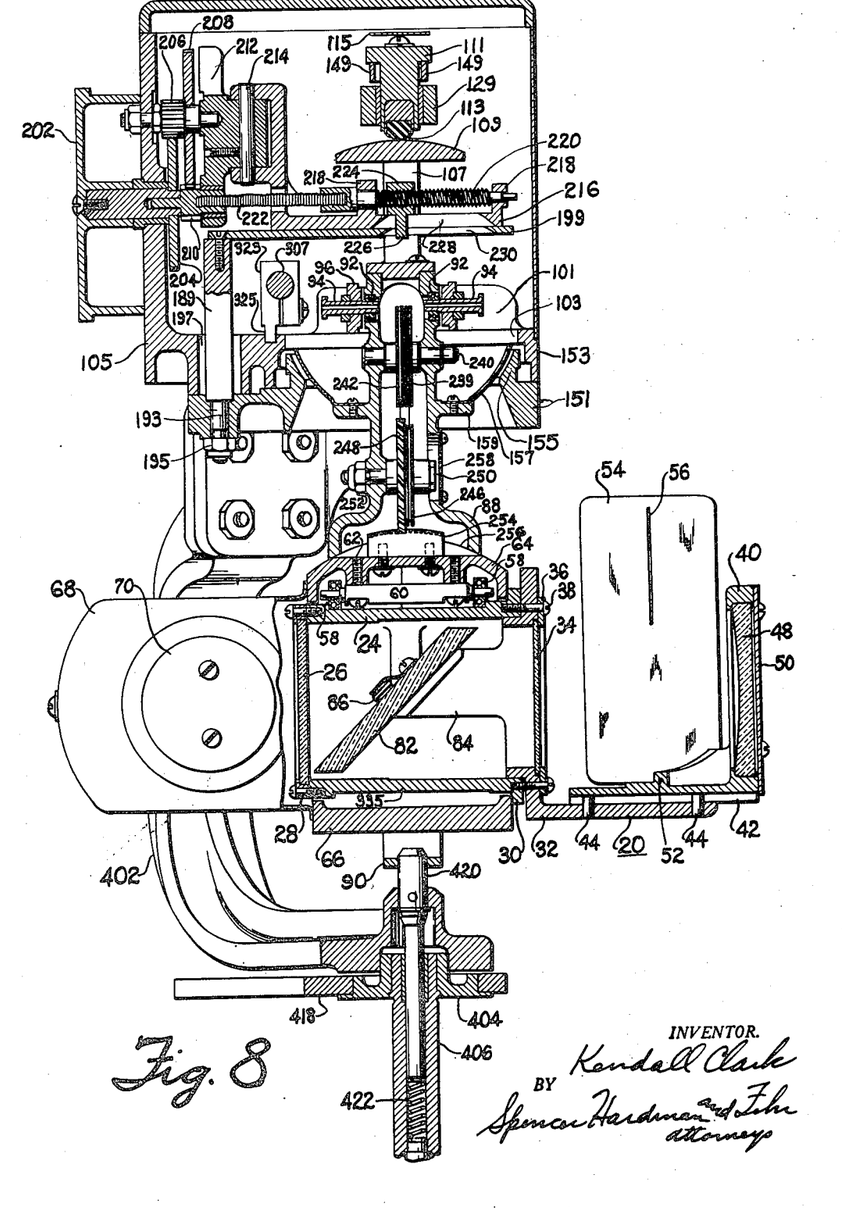
Fig. 8 is a sectional view taken substantially along the line 8—8 of Figs. 4 and 6.
Figure 9:
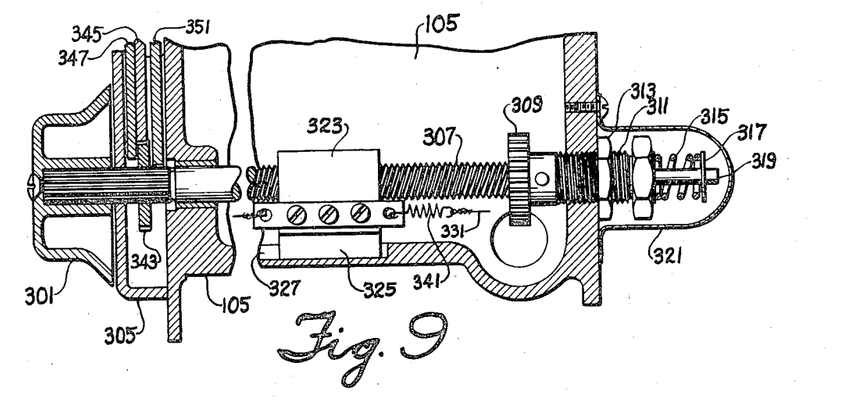
Fig. 9 is a fragmentary sectional view taken substantially along the line 9—9 of Fig. 4.

By this arrangement in assembling, the casing 105 is placed upon the support member 151 so that the projections 163 pass through the recess provided between the projections 161 and then when the flange 153 rests upon the member 151, the casing 105 is given a quarter turn so as to cause the projections 163 to overlay the projections 161 to form an interlocking arrangement of the bayonet-slot-type (see Fig. 6 and compare with Fig. 8). This arrangement permits the casing 105, the pendulum, together with the collimator at its lower end, to be rotated with respect to the support 151.

The means for doing this includes a gear segment 165 provided upon a portion of the support member 151 which is in mesh with a worm 167 upon a shaft 169. To prevent backlash, the gear 171 is held against a bearing provided in the drift bearing member 168 for the shaft 169, by a spring 173 provided upon the opposite end of the second bearing 175. Where the bobsight is controlled by an automatic computer, the gear 171 will be in mesh with a pinion whose shaft is rotatably supported in the bearing 177. The connection to the computer will be made through the threaded opening 179. The drift may be set into the instrument by sighting through the reflecting glass 54 onto the ground and turning the drift shaft 169 by its knob 181 until the objects passing beneath the plane follow exactly the line 56 inscribed on the reflecting glass 54.

However, in most cases the setting will be taken from the instruments of the airplane which will supply the drift angle. For this reason a drift scale 183 is fastened to the casing 105 and an indicator 187 is fastened to the support member 151. The indicator 187 will thereby directly indicate the amount of drift which is set into the instrument. This will make it possible to turn the collimator so that the pivot pins 87 are directly in alignment with the ground track of the airplane. The axis of the pins 87 is designated as the cross trail axis in Fig. 1, and is parallel to the lines GH, AB and EF. The heading of the aircraft is at an angle to the cross trail axis which corresponds to the angle of drift of the plane. The case 105 is rotated with the pendulum and collimator so that all these parts, when the drift is properly set into the instrument, correspond to the true ground track of the aircraft.

The cross trail adjustment

It is not enough merely to correct for the drift but it is also necessary to correct for the lateral movement of the bomb due to the effect of wind. It should be observed that the sighting line AT is in the plane ABFE. This plane ABFE is not vertical but is tilted at an angle CTD from the vertical. In order to tilt the collimator through an angle equal to the angle CTD so that its sighting line falls within this tilted plane ABFE, the collimator is pivotally mounted on the cross trail axis provided by the pins 87. To properly tilt the collimator upon its cross trail axis there is fixed to the support member 151 a vertical rectangular support bar 189 fixed at its lower end within a groove 191 provided in the upper face of the support member 151. A stud 193 projects downwardly from the bottom of the bar through an aperture in the support 151 and the bar 189 is secured in place by a nut 195 at the lower end of the stud 193. The bar 189 extends upwardly through an arcuate slot 197 in the bottom of the casing 105. At the top of the bar 189 a cross trail alignment slotted arm 199 is securely fastened by a screw and by brazing so that it is rigid with the bar 189 as well as the support 151. By this arrangement, the cross trail slotted arm 199 will remain stationary as the casing 105 is rotated to correct for drift. The amount of cross trail is proportional to the sine of the drift angle multiplied by the trail. However, instead of using the cross trail directly in this instrument, the cross trail angle CTD is used.

Figures 2, 3:
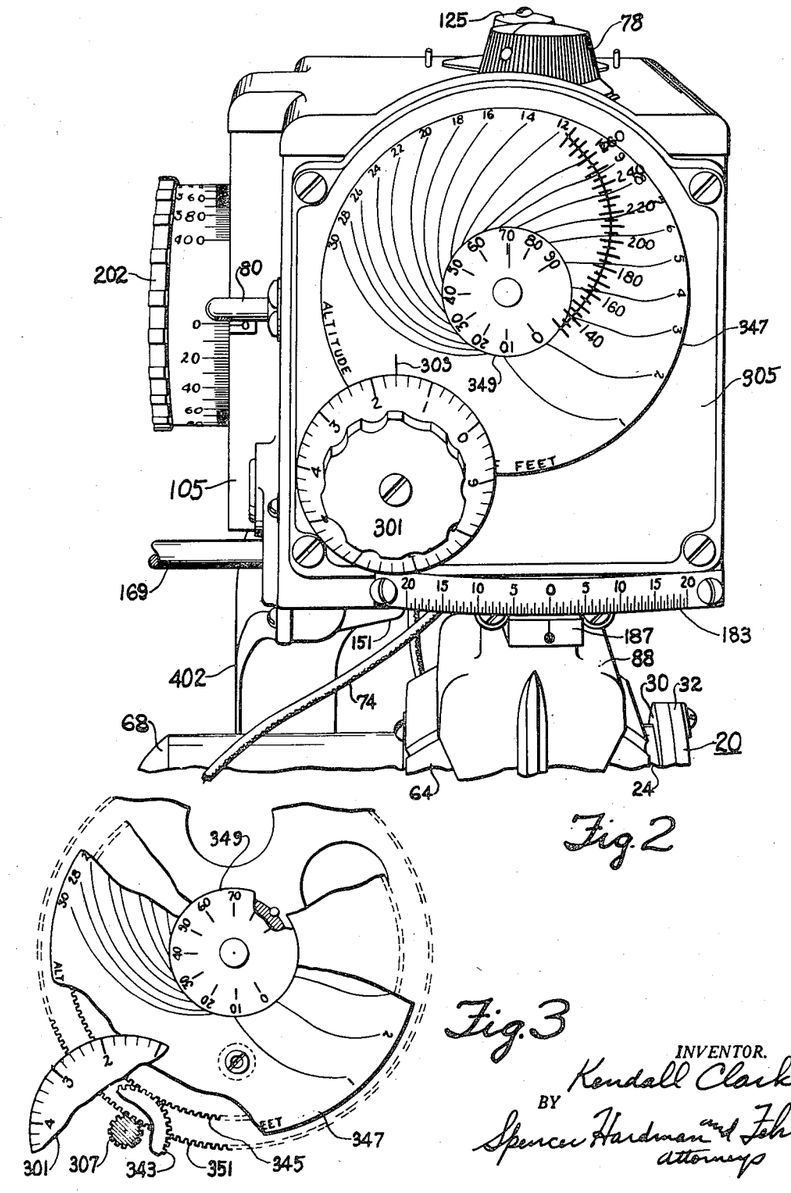
Fig. 2 is a perspective view of the upper portion of my bombsight showing the dropping angle and cross trail knobs.
Fig. 3 is a fragmentary view showing the gearing arrangements for the dropping angle setting device.

In order to automatically compute this factor, there is provided on one face of the casing 105 a trail knob and dial 202 which is graduated in mills from zero to 400, as shown in Fig. 2. This trail dial is fastened onto a shaft which within the casing 105 carries a gear 204 which meshes with a pinion 206 fixed to a second gear 208 in mesh with a second pinion 210 which is rotatably mounted in a support member 212 within the casing 105. Pivoted by the pin 214 to the support 212 is the cross trail guide member 216 which is provided with bearings 218 supporting a screw 220. This screw 220 is connected by a flexible shaft 222 to the pinion 210. The screw 220 is provided with a nut 224 having a projection 226 which extends downwardly through a slot 228 in the cross trail guide 216 as well as through a slot 230 in the cross trail arm 199.

Figures 4, 5:
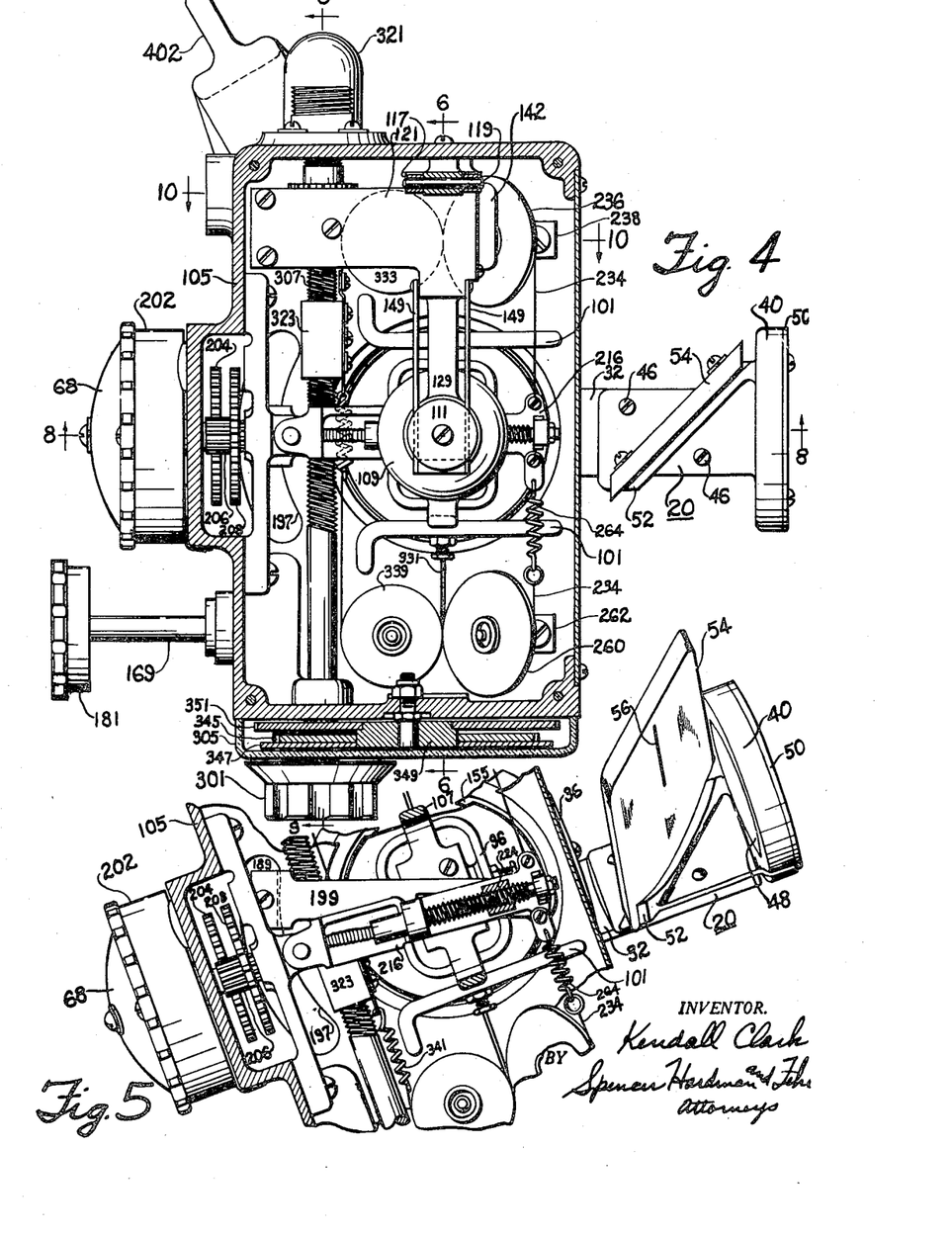
Fig. 4 is a top sectional view of my improved bombsight set for a 90 degree dropping angle and zero drift and cross trail.
Fig. 5 is a fragmentary sectional view similar to Fig. 4 with the bombsight set at a 60 degree dropping angle, a 15 degree drift and substantially maximum cross-trail.

A comparison of Figs. 4 and 5 will illustrate the action of this cross trail adjustment. When there is no drift, the cross trail guide 216 and the cross trail arm 199 are superimposed as shown in Figs. 4 and 8. When there is drift, the casing 105, the trail dial 202 and the pivot pin 214 will turn relative to the cross trail arm 199 as shown in Fig. 5. The angularity of the cross trail guide 216 will be determined by the position of the projection 226 of the nut 224. This projection will determine the point of intersection of the slot 228 of the guide 216 and the slot 230 of the cross trail arm 199. This point of intersection together with the position of the pivot pin 214 determines the angularity of the cross trail guide.

Figure 12:
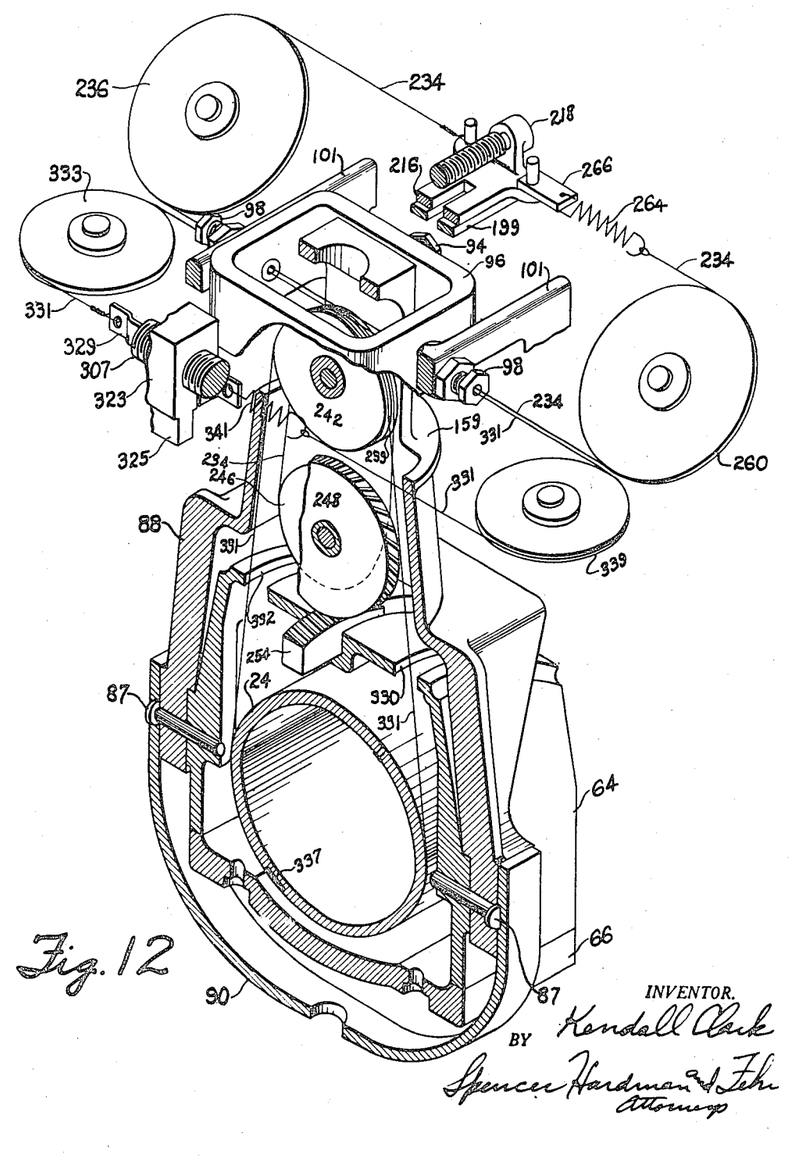
Fig. 12 is a fragmentary isometric sectional view showing the wire drive arrangement for adjusting the position of the collimator.

The cross trail guide together with the gearing 204 to 210 and the threading of the shaft 220 and the nut 224 are so proportioned that the guide 216 is moved to an angle proportional to the angle CTD or GEA in Fig. 1 representing the angle of cross trail or angle of lateral deflection of the bomb. In order to tilt the collimator 20 upon its supporting pins 87 forming the cross trail axis an amount equal to this cross trail angle CTD, I provide a wire drive (see Fig. 12) which includes a wire 234 fastened at one end by a screw to an ear formed at the end of the guide member 216 adjacent the bearing 218. This wire 234 is supported upon an inclined pulley 236 rotatably mounted upon the inclined surface of the block 238 (see Fig. 10). After passing 180 degrees around the pulley 236, the wire 234 passes through one of the bushings 98 and then extends 90 degrees around the pulley 239 which is rotatably mounted upon the shaft 240 fixed in the upper end of the pendulum member 88. The pulley 239 as well as its companion pulley 242, immediately beside it, are positioned so that the top of their grooves is substantially tangent to the axis of the hollow pins 98.

The wire 234 continues on around a pulley 246 fixed to a helical gear 248 and both are rotatably mounted upon a shaft 250 which is fastened to the one side wall of the pendulum member 88 by a nut 252. Close tolerances must be maintained to prevent axial movement of the helical gear 248 and yet permit the gear to rotate freely. The bottom of the gear 248 meshes with a helical gear segment 254 fastened to the top of the collimator support 64 by a pair of screws appearing in Fig. 8 just above the shaft 60. The collimator support 64 is machined to a substantially cylindrical shape with its center based on the pins 87 and this surface fits closely the lower end of the pendulum member 88. The gear segment 254 is lodged within a groove extending across the collimator support 64 transverse to the pivots 87, and segments 256 are provided on opposite sides of the gear segment within this groove to preserve the seal at the bottom of the pendulum member 88. An access opening in the pendulum member 88 opposite the shaft 250 is provided with a removable cover 258.

The wire 234 is fastened to the bottom of the pulley 246 by solder in order to prevent slippage. After passing 180 degrees around the pulley 246, the wire 234 extends upwardly to the opposite side of the pulley 239 and thence passes 90 degrees around the pulley 239 and extends through the other hollow pivot pin 98 to the pulley 260 which is likewise rotatably mounted upon an angular block 262. The blocks 238 and 262 hold the pulleys 236 and 260 at such an angle and the pulleys 236 and 260 have such a diameter that their upper edges are substantially in alignment with the end of the cross trail guide 216 while their lower edges are substantially in alignment with the hollow pivot pins 98.

The wire 234 after passing 180 degrees around the pulley 260 connects to a tension coil spring 264 which in turn is connected by a link 266 to the end of the cross trail guide 216 adjacent the bearing 218. The tension coil spring 264 keeps the wire 234 taut at all times. Any lateral movement of the end of the cross trail guide 216 will cause a lateral movement of the wire 234 which will turn the pulley 246 and its gear 248. The turning of the gear 248 will cause the gear segment 254 and the collimator support 64 to be rotated upon the pins 87 so as to tilt the collimator 20 corresponding to the angle CTD in Fig. 1. This tilts the axis of the collimator 20 which is marked dropping angle axis in Fig. 1 since it serves as the axis of rotation of the collimator.

The dropping angle adjustment

The remaining adjustment of the bombsight is the adjustment of the collimator to the sighting line AT in Fig. 1. To make this adjustment there is provided a dropping angle knob 301 upon the end face of the casing 105. This dropping angle knob 301 is provided with a skirt bearing ten graduations corresponding to 10 degrees and these graduations cooperate with an index mark 303 provided upon a transparent dial cover 305 which is provided upon the end face of the casing 105. The knob 301 is fastened onto the splined end of a threaded shaft 307 which is rotatably mounted in bearings provided in the ends of the casing 105. The rear end of the shaft 307 is provided with a gear 309, the hub of which is held tightly against the end of an axially adjustable bearing member 311 threaded into the rear wall of the casing 105 and adjustably locked in place by a lock nut 313. The means for holding the hub of the gear 309 against the end of the bearing bushing 311 is a compression coil spring 315 which extends between the outer end of the bearing bushing 311 and a disc 317 fixed on the reduced projecting end 319 of the threaded dropping angle shaft 307. A removable cover 321 is provided for access to this adjusting device by which the bearing bushing 311 may be adjusted axially to move the dropping angle shaft 307 axially for adjusting purposes.

The dropping angle screw or threaded shaft 307 carries the dropping angle nut 323 provided with a tongue 325 which rides in a groove 327 parallel to the shaft 307 in the bottom of the casing 105. This nut 323 carries a wire connector 329 connecting to the wire 331 (see Fig. 12) which passes 180 degrees clockwise around the pulley 333 rotatably mounted on the bottom of the casing 105. This wire 331 then extends through the aperture in the adjacent hollow pivot pin 98 and thence a quarter of a revolution clockwise around the idler pulley 242. From this point the wire 331 extends through a slot 330 in the top of the collimator support 64 and is received within a groove 335 extending around the barrel 24 of the collimator 20. The barrel 24 is also provided with a transverse groove receiving a grooved key block 337 and the wire is lodged and soldered within the groove of the key block 337 so that the wire 331 is keyed to the barrel 24 of the collimator 20.

As mentioned in the beginning of this description the barrel 24 is rotatably mounted upon its axis by means of the three pairs of ball bearings which are mounted upon the ends of the shafts 60. The wire 331 continues 180 degrees counterclockwise in the groove 335 around the bottom of the barrel 24 and thence extends upwardly through the slot 332 to the idler pulley 242 continuing 90 degrees clockwise around the upper half of the idler pulley 242 and thence horizontally to the pulley 339 which is rotatably mounted on the bottom of the casing 105. The wire 331 continues 180 degrees clockwise around the pulley 339 and extends to a tension coil spring 341 which is hooked to the end of the wire connector 329 fastened to the nut 323. By this arrangement, when the dropping angle knob 301 is turned to rotate the dropping angle screw 307, the nut 323 is moved axially along the screw to move the wire 331 so as to rotate the barrel 24 of the collimator 20. It is necessary that this be very exact.

The trail values for setting the knob 202 as well as the dropping angle values for setting the dropping angle knob 301 may be obtained from tables which are made up from experimental tests on the bombs. However, in order to make it possible to use this bombsight without resorting to the tables there is provided a simple calculator for determining the dropping angle. It is not necessary for an experienced bomber to resort to tables for determining the position of the trail dial 202 since at low altitudes at which it is intended the dropping angle may be set by the calculator. The trail is quite small and the cross trail which is affected by the trail is also very small so that this factor need not be set accurately. For example, the trail may be set to 30 mills for this purpose. If desired, however, a simple calculator for the trail similar to the calculator provided for dropping angle may be provided.

The dropping angle calculator

To calculate the dropping angle, the splined end of the dropping angle shaft 307 is provided with a small gear 343 which meshes with a large gear 345 fastened by screws to the rear face of the calculator dial 347. This calculator dial 347 is provided with ten curved lines marked 1 to 10 consecutively and additional curved lines numbered 12 to 30 in even numbers only. These curved lines represent dropping angle values at various plane speeds for altitudes above the target of 100 to 3000 ft. These curved lines are grooves in the dial which are filled with a fluorescent paint. The transparent dial cover 305 is provided with a speed scale, at the side of which are numbers 140 to 260 at intervals of 20. This scale and these numbers are in the form of grooves on the rear face of the transparent dial cover 305 which are filled with fluorescent paint.

By placing the curved line corresponding to the altitude of the plane above the target so that it crosses the speed scale at the point corresponding to the speed of the plane in M. P. H., the dropping angle will be properly calculated for the bomb for which the scale is designed. In Fig. 2, the dropping angle dial and calculator is shown set for any of the following conditions: 140 M. P. H. at 300 ft.; 163 M. P. H. at 400 ft.; 184 M. P. H. at 500 ft.; 204 M. P. H. at 600 ft.; 216 M. P. H. at 700 ft., etc. Intermediate values may be interpolated. However, inasmuch as the variation between the different bombs in the correct dropping angle at altitudes up to 3000 ft., amounts to an error of not more than 8 ft. on the ground, it is possible to make one dial for the average characteristic of the different bombs to be used which will be reasonably accurate for such elevations. If greater accuracy is desired, separate dials for each different bomb may be provided and the dials changed to correspond to the type of bomb to be used.

In the center of the dial 347 there is provided the dropping angle dial 349 which is rotatable independently of the calculator dial 347 and its gear 345, but upon the same axis. This dropping angle dial 349 is fixed to the large gear 351 which meshes with the splined end of the shaft 307. This gearing is made in such a ratio that one turn of the knob 301 corresponds to 10 degrees which is the interval between the figures on the dial 349. The dial 349 is marked 0 to 90 in intervals of 10 and is provided with an index which in Fig. 2 is directly to the right of the index 70 on the dial 349 and taken with the scale on the knob 301, a dropping angle setting of 71.6 degrees is indicated. This index adjacent the index 70 is provided in the form of a groove on the rear face of the transparent dial cover 305 which is preferably filled with fluorescent paint.

The mounting

The supporting member 151 is fastened to a C-shaped mounting bracket 402 (see Fig. 6). This mounting bracket 402 is rotatably supported upon a bearing member 404 provided with a vertical tube 406. This bearing member 404 and its tube 406 are rotatably mounted in a suitable socket provided for it in the plane. Fixed to the lower end of the mounting bracket 402 is a bearing member 408 provided with an index member 410 which cooperates with a scale provided upon the socket in the plane. The position of the mounting bracket 402 relative to the airplane is adjusted by the worm 412 which meshes with a rack provided with the socket on the plane. After adjustment, this worm 412 may be locked in place. A second worm 414 is rotatably carried by the member 408 and is provided with a knob (not shown). This worm 414 meshes with a gear segment 416 which is fixed to a lever 418 which may be connected to the turn dial provided in the pilot's compartment to indicate the course for the plane to follow in its bombing run. By this arrangement the support 151 can always be adjusted to its proper position with respect to the plane.

The support 402 also carries a removable pin 420 which may be moved upwardly to enter an aperture in the yoke 90 as shown in Figs. 6 and 8, to prevent the movement of the pendulum 88 when the bombsight is not being used. This pin is provided with a lock in the form of a bayonet slot arrangement, not shown, which makes it possible to hold it free of the yoke 90, when it is in its down or disengaged position. When the lock is released the pin 420 will be held up in the position shown in Figs. 6 and 8 by the spring 422. This prevents any swinging of the pendulum 88 when the bombsight is not in use.

While the form of embodiment of the invention as herein disclosed, constitutes a preferred form, it is to be understood that other forms might be adopted, as may come within the scope of the claims which follow.

What is claimed is as follows:

1. A sight comprising a support, a pendulum, a universal mounting connecting the pendulum and said support, a sighting device mounted upon the pendulum below the universal mounting, said pendulum being provided with a substantially spherical surface above said universal mounting, and vibrating damping means intermittently engaging said surface for snubbing vibrations of the pendulum.

2. A sight comprising a first movable support provided with a horizontal pivot, means for keeping said pivot horizontal, means for rotating said pivot in a horizontal plane, a movable mounting pivotally supported upon said pivot, a sighting device rotatably supported by said movable mounting upon an axis transverse to the axis of said pivot, a second support for movably supporting said first support, and means responsive to the relative movement between said first and second supports for tilting said movable mounting upon said pivot.

3. A sight comprising a first movable support provided with a horizontal pivot, means for keeping said pivot horizontal, means for rotating said pivot in a horizontal plane, a movable mounting pivotally supported upon said pivot, a sighting device rotatably supported by said movable mounting upon an axis transverse to the axis of said pivot, a second support for movably supporting said first support and means responsive to the relative rotation between said second support and said pivot for tilting said movable mounting upon said pivot.

4. A sight including a first support, a pendulum suspended from said first support, a universal mounting connecting the pendulum to the support to provide a universal pivot for the support, an optical sighting device mounted upon said pendulum beneath said pivot, a member provided with a spherically shaped surface above said pivot, a member having a portion of its surface normally in engagement with said spherical surface, one of said members being connected to the pendulum and the other to said first support, means for intermittently separating said members to allow the pendulum to move.

5. A sight comprising a first support, a second support rotatably mounted on said support on a substantially vertical axis, a third support connected to the second support by a universal connection non-rotatable with respect to said second support on a substantially vertical axis and provided with means for keeping itself in a definite relationship to gravity, a fourth support pivoted to the third support having a pivoting axis in a plane transverse to the pull of gravity, a fifth support pivoted to the fourth support on an axis parallel to said transverse plane perpendicular to the pivoting axis of the pivot connecting the third and fourth supports, a sighting means providing a line of sight fixed to said fifth support, and means for rotating the second support relative to the first support and for pivoting the fourth support relative to the third and the fifth support relative to the fourth to set the sighting means and the line of sight to the desired position relative to the first support.

6. A sight comprising a support, a member rotatably mounted upon said support on the nominal vertical axis of said support, a pendulum, a universal connection connecting said member and said pendulum, said pendulum being provided with a pivot means in a plane perpendicular to its natural vertical axis and a mounting connected to and movable upon the pivot means, said mounting being provided with a rotatable means having an axis of rotation perpendicular to the axis of said pivot means and a sighting device carried by and rotatable with said rotatable means for providing a line of sight.

7. A sight comprising a first rotatable support provided with a pivot, a second support for rotatably supporting said first support, a movable mounting pivotally supported on said pivot, said movable mounting being provided with a sighting device, a lever provided with a first pivotal connection with said first support and a second pivotal connection with said second support, means for moving said first and second pivotal connections toward and away from each other, means for rotating said first support relative to the second support and pivoting said lever thereby, and means responsive to the relative movement between said first support and a portion of said lever for moving said movable mounting.

8. A sight comprising a first rotatable support provided with a horizontal pivot and means for keeping said pivot horizontal, a second support for rotatably supporting said first support, a movable mounting pivotally supported on said pivot, said movable mounting being provided with a bearing having an axis transverse to the axis of said pivot, a sighting device rotatably supported by said bearing, a lever provided with a first pivotal connection with said first support and a second pivotal connection with said second support, means for moving said first and second pivotal connections toward and away from each other, means for rotating said first support relative to the second support and pivoting said lever thereby, means responsive to the relative movement between said first support and a portion of said lever for moving said movable mounting, and means for rotating said sighting device upon said bearing.

9. A sight including a mounting, a light source, a reticule illuminated by the light source and supported by said mounting, a collimating means supported by said mounting for collimating the light rays emanating from the reticule, a transparent reflector plate upon said mounting positioned in the path of but at an angle to the collimated light rays so that the collimated rays are reflected by the plate to establish the image of the reticule and thereby a line of sight, means for rotatably supporting said mounting upon a second axis substantially parallel to the axis of the collimating means, a second means for pivotally supporting the first means upon a third axis at right angles to the second axis, a third means for rotatably supporting said second means upon a fourth axis at right angles to the third axis.

10. A sight including a mounting, a light source, a reticule illuminated by the light source and supported by said mounting, a collimating means supported by said mounting for collimating the light rays emanating from the reticule, a transparent reflector plate upon said mounting positioned in the path of but at an angle to the collimated light rays so that the collimated rays are reflected by the plate to establish the image of the reticule and thereby a line of sight, means for rotatably supporting said mounting upon a second axis substantially parallel to the axis of the collimating means, a second means for pivotally supporting the first means upon a third axis at right angles to the second axis, a third means for rotatably supporting said second means upon a fourth axis at right angles to the third axis, a universal connection between said second and third means and a stabilizing means for stabilizing said second means.

11. A sight including a support, a pendulum, a universal connection connecting the pendulum to the support, a sighting device mounted on said pendulum but movably mounted relative thereto, a pulley rotatably mounted upon said pendulum having a point on the path of its rim substantially coinciding with the pivot point of the pendulum, a manipulating means mounted upon said support, and a thread extending from said manipulating means over a portion of the rim of said pulley to said sighting device for moving the sighting device relative to the pendulum.

12. A sight including a support, a pendulum, a universal connection connecting the pendulum to the support, a sighting device movably mounted on said pendulum relative to two different axes, two pulleys rotatably mounted on said pendulum each having a point on the path of its rim substantially coinciding with the pivot point of said universal connection, two manipulating means mounted upon said support, and a thread extending from each of said manipulating means over a portion of the rim of one of the pulleys to said sighting device for moving the sighting device upon the two different axes.

13. A sight comprising a first rotatable support, a second support for rotatably supporting the first support, a movable mounting movably supported on said first support, said movable mounting being provided with a sighting device, a lever member provided with a first pivotal connection with one of said supports, a second member fixed to the other support, one of said members being provided with an elongated slot, the other of said members being provided with a screw and a nut threaded upon said screw, said nut having means extending into said slot to form a second pivotal connection, means for rotating the screw to traverse the nut thereon to move the pivotal connections toward or away from each other, means for rotating the first support relative to the second support and pivoting the lever thereby, and means responsive to the pivoting of said lever for moving said mounting relative to said first support.

KENDALL CLARK.

REFERENCES CITED

The following references are of record in the file of this patent:

UNITED STATES PATENTS

| Number | Name | Date |
|---|---|---|
| 1,152,946 | Hasburg | Sept. 7, 1915 |
| 1,235,909 | Miller | Aug. 17, 1917 |
| 1,936,576 | Barth | Nov. 28, 1933 |
| 2,313,204 | Morelle | Mar. 9, 1943 |
| 2,358,316 | Chwalow | Sept. 19, 1944 |
| 2,364,152 | MacGill | Dec. 5, 1944 |
| 2,366,410 | Kemperer et al. | Jan. 2, 1945 |
| 2,383,952 | Bates | Sept. 4, 1945 |
| 2,384,036 | Kemperer et al. | Sept. 4, 1945 |

FOREIGN PATENTS

| Number | Country | Date |
|---|---|---|
| 804,208 | France | July 27, 1936 |